(12) United States Patent
Akashi

(10) Patent No.: US 8,989,498 B2
(45) Date of Patent: Mar. 24, 2015

(54) SYSTEM, INFORMATION PROVIDING METHOD AND ELECTRONIC DEVICE

(71) Applicant: Kabushiki Kaisha Toshiba, Minato-ku, Tokyo (JP)

(72) Inventor: Aiko Akashi, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 13/922,822

(22) Filed: Jun. 20, 2013

(65) Prior Publication Data

US 2014/0119660 A1    May 1, 2014

(30) Foreign Application Priority Data

Oct. 31, 2012   (JP) .................. 2012-240195

(51) Int. Cl.
*G06K 9/00* (2006.01)
*G06K 9/20* (2006.01)
*G06K 9/22* (2006.01)

(52) U.S. Cl.
CPC .......... *G06K 9/00865* (2013.01); *G06K 9/2081* (2013.01); *G06K 9/222* (2013.01)
USPC ............. 382/189; 706/45; 715/277; 382/187; 382/188; 382/312; 382/313; 382/173

(58) Field of Classification Search
CPC ........................... G06K 9/00865; G06K 9/222
USPC ................. 382/187, 188, 173, 312, 313, 189; 706/45; 715/277
See application file for complete search history.

(56) References Cited

U.S. PATENT DOCUMENTS

2009/0063431 A1*   3/2009   Erol et al. .................. 707/3
2010/0223221 A1*   9/2010   Gardner et al. ............ 706/45

FOREIGN PATENT DOCUMENTS

JP        2010-262584 A    11/2010
JP        2012-190303 A    10/2012

* cited by examiner

*Primary Examiner* — Mike Rahmjoo
(74) *Attorney, Agent, or Firm* — Knobbe, Martens, Olson & Bear LLP

(57) ABSTRACT

According to one embodiment, a system stores a plurality of contents in a storage medium, each content includes handwritten data including stroke data corresponding to strokes which are handwritten, image data corresponding to the strokes, and retrieval information for retrieving the handwritten data. The system provides, upon receiving a retrieve request including a character string from a terminal, to the terminal either the handwritten data in the content corresponding to first retrieval information, the first retrieval information corresponding to the character string from among retrieval information of the plurality of contents, or the image data in the content corresponding to the first retrieval information.

15 Claims, 9 Drawing Sheets

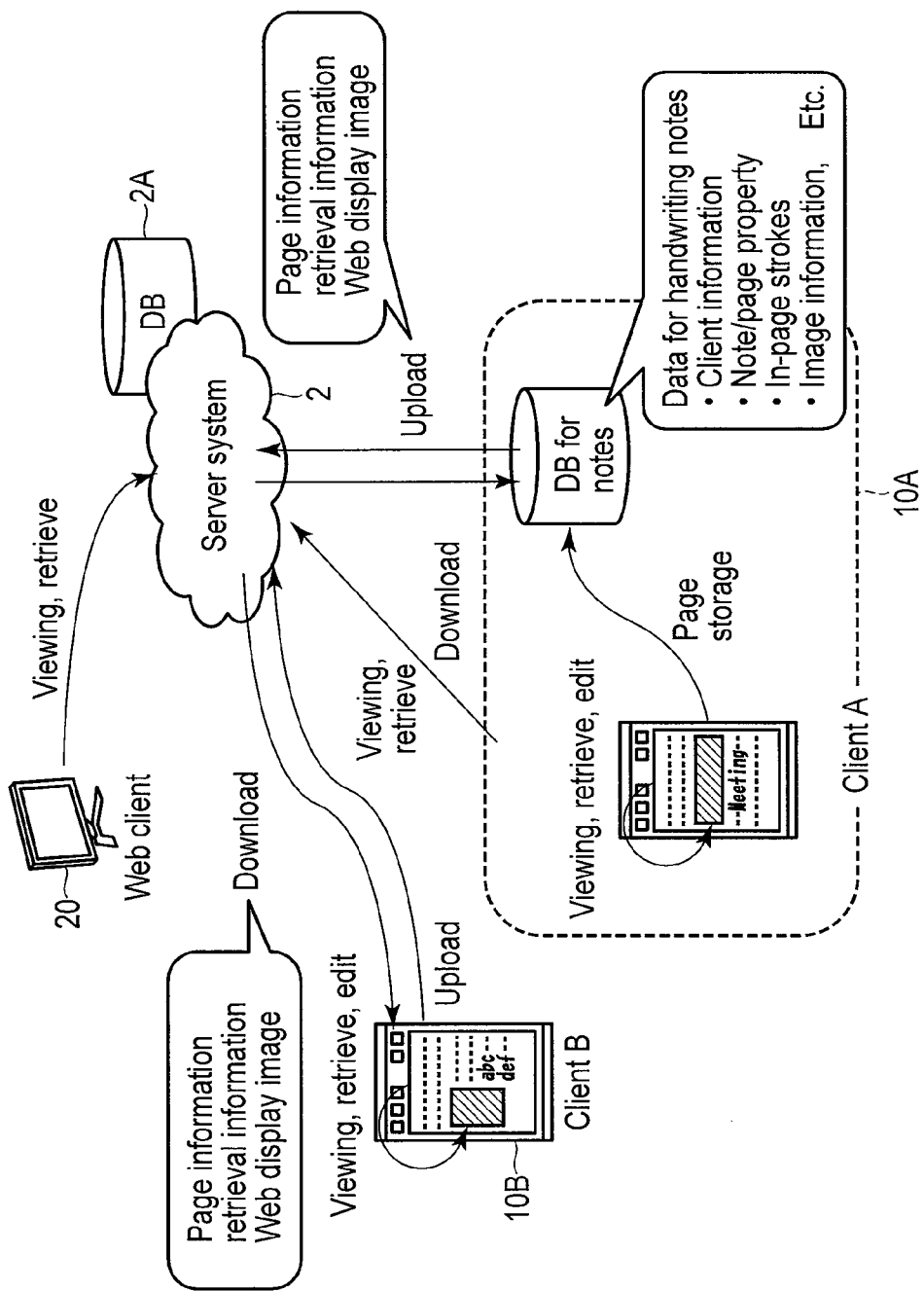
F I G. 6

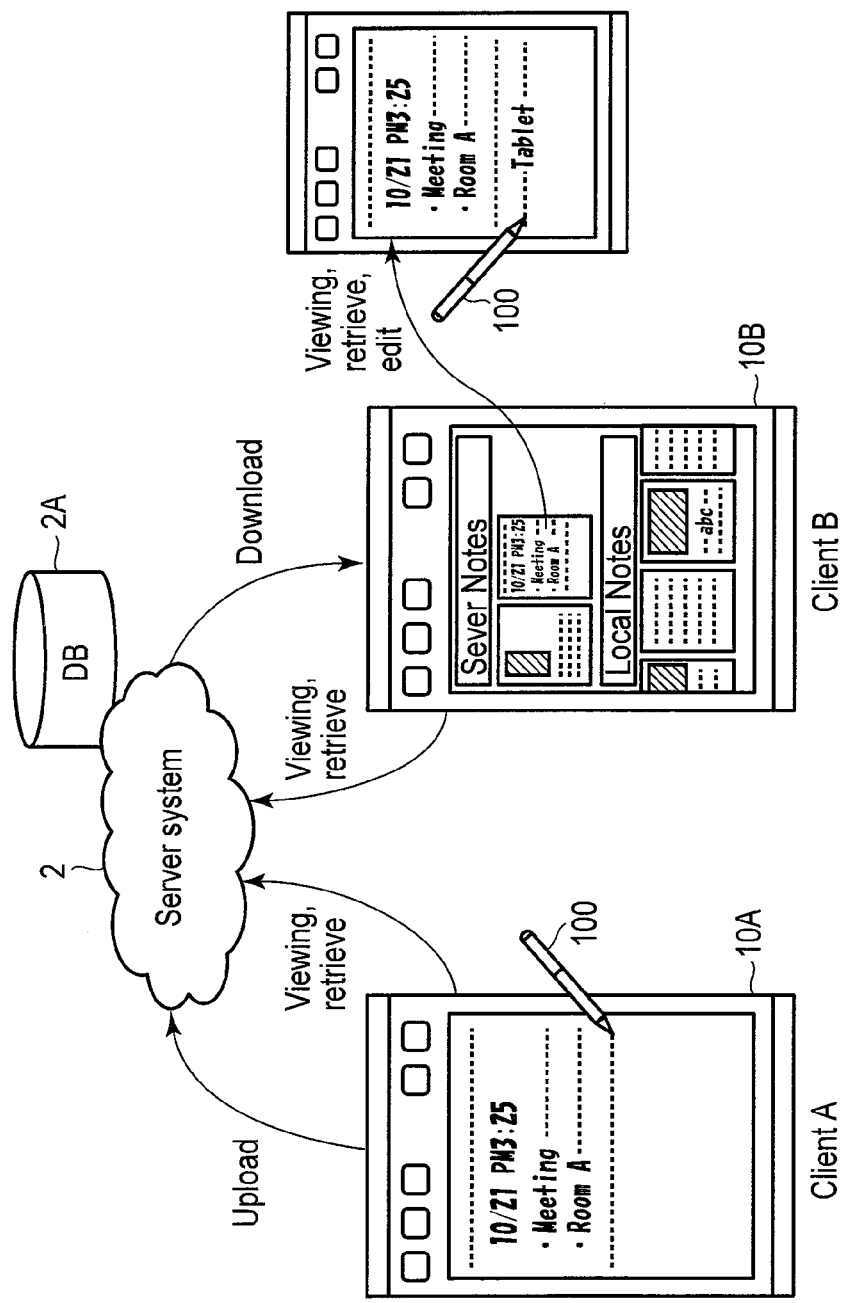
F I G. 7

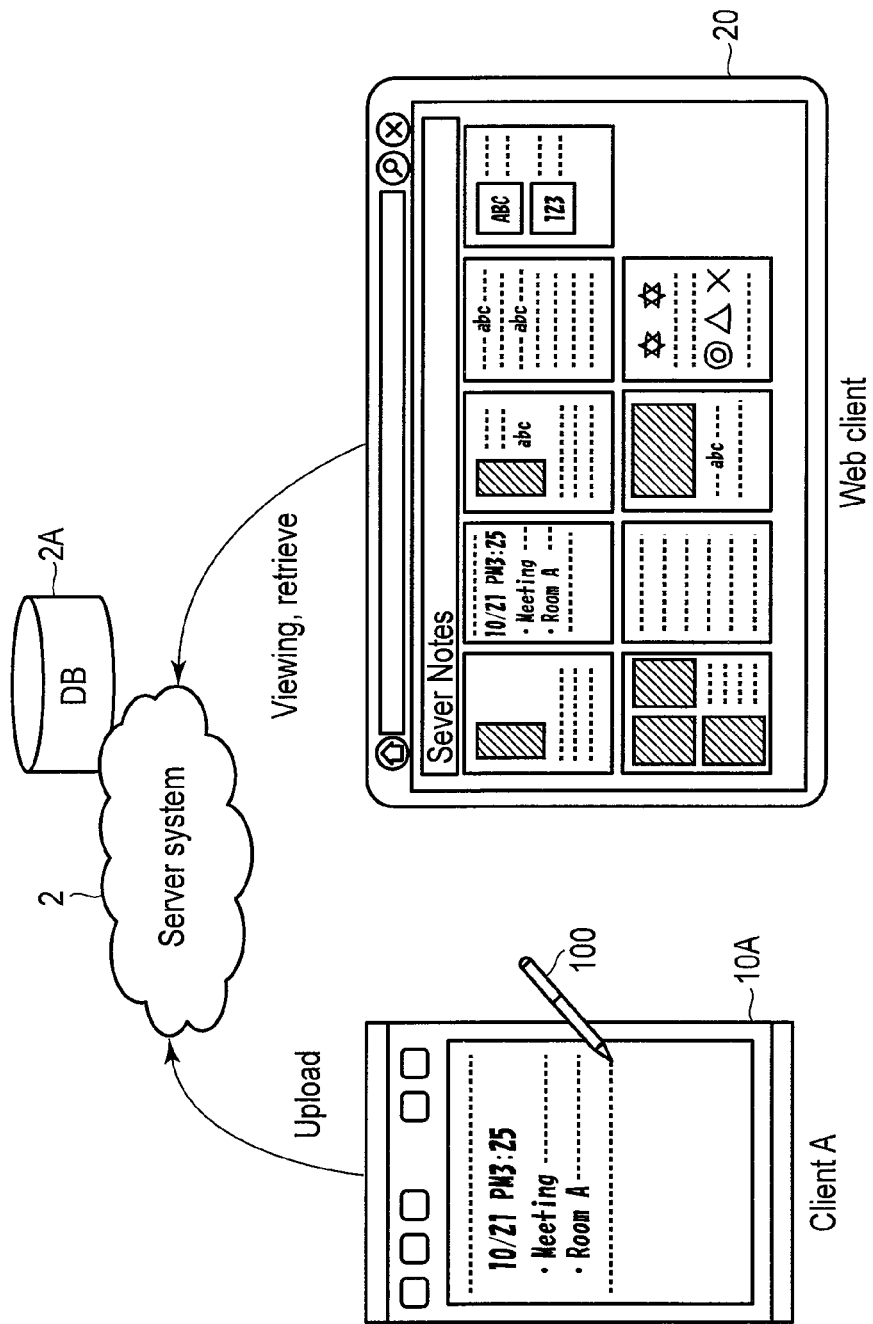
F I G. 8

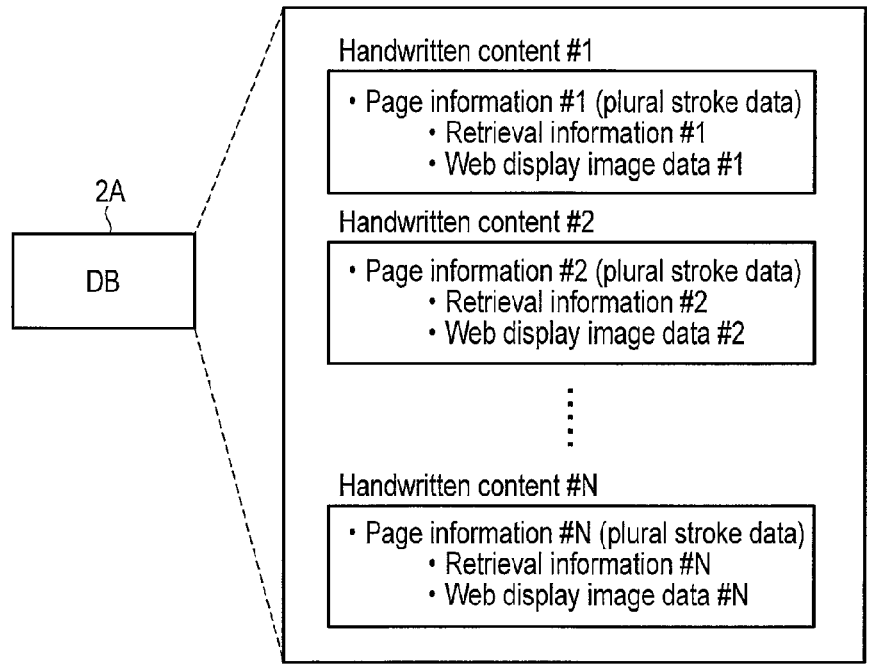
F I G. 9
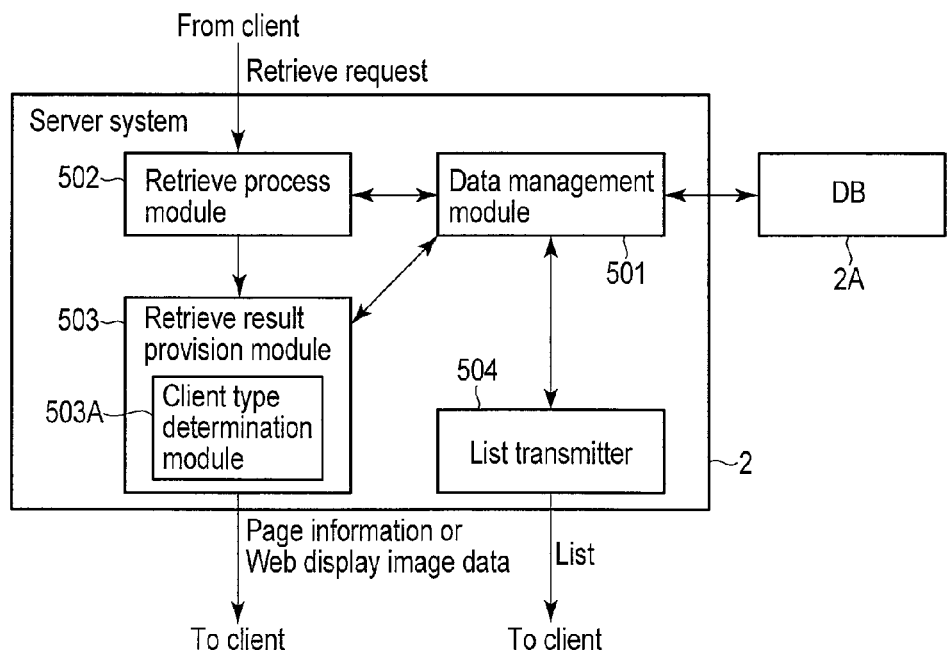
F I G. 10

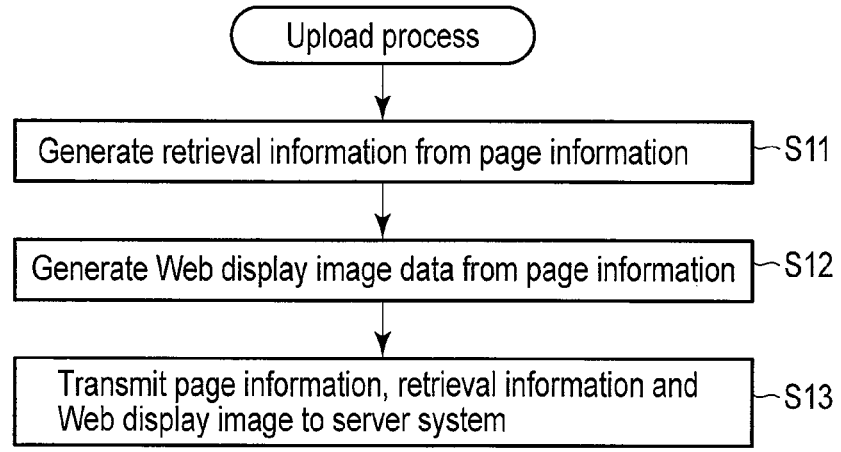
F I G. 1 1
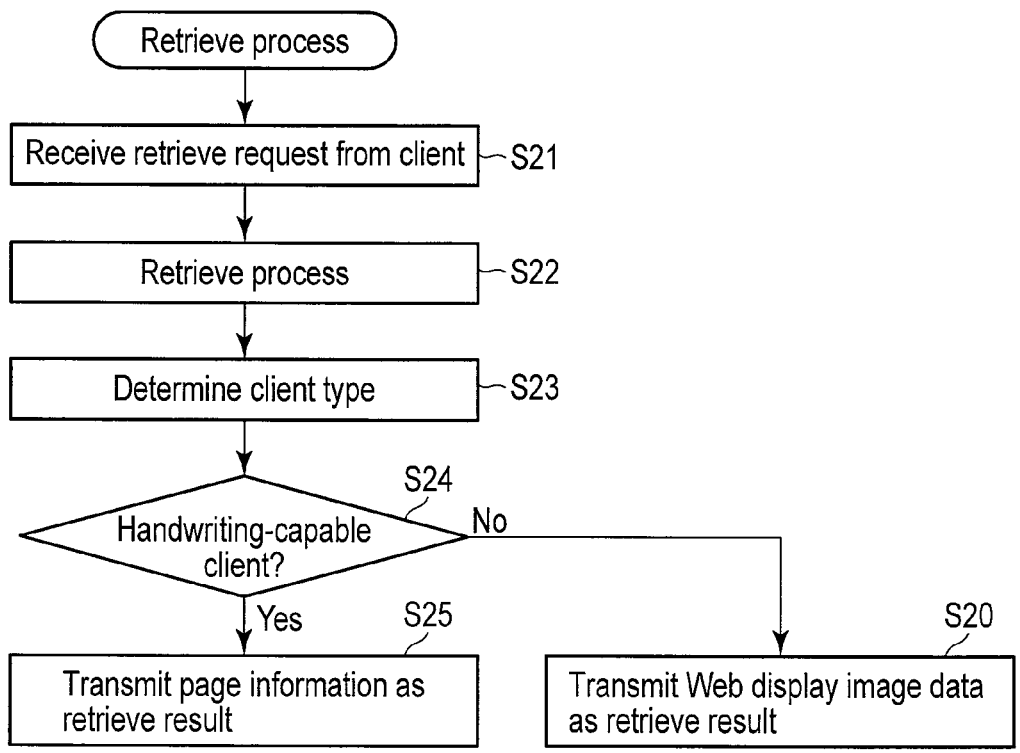
F I G. 1 2

SYSTEM, INFORMATION PROVIDING METHOD AND ELECTRONIC DEVICE

CROSS-REFERENCE TO RELATED APPLICATIONS

This application is based upon and claims the benefit of priority from Japanese Patent Application No. 2012-240195, filed Oct. 31, 2012, the entire contents of which are incorporated herein by reference.

FIELD

Embodiments described herein relate generally to a technique for processing handwritten data.

BACKGROUND

In recent years, various kinds of electronic devices, such as a tablet, a PDA and a smartphone, have been developed. Most of these electronic devices include touch-screen displays for facilitating input operations by users.

By touching a menu or an object, which is displayed on the touch-screen display, by a finger or the like, the user can instruct an electronic device to execute a function which is associated with the menu or object.

However, most of existing electronic devices with touch-screen displays are consumer products which are designed to enhance operability on various media data such as video and music, and are not necessarily suitable for use in a business situation such as a meeting, a business negotiation or product development. Thus, in business situations, paper-based pocket notebooks have still been widely used.

In business situations, there are cases that electronic devices are expected to function as digital tools which can make easier the re-use of handwritten information which was created in the past. Thus, it is necessary to realize a new technique which enables easy handling of handwritten information.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is an exemplary view illustrating a flow of data between a server system according to the embodiment and each of client terminals.

FIG. 7 is an exemplary view illustrating a flow of handwritten page data between handwriting function-capable client terminals via the server system of FIG. 6.

FIG. 8 is an exemplary view illustrating a flow of handwritten page data between a handwriting function-capable client terminal and a Web client via the server system of FIG. 6.

FIG. 9 is an exemplary view illustrating a data structure of handwritten contents which are managed by the server system of FIG. 6.

FIG. 10 is an exemplary block diagram illustrating a system configuration of the server system of FIG. 6.

FIG. 11 is an exemplary flowchart illustrating the procedure of an upload process which is executed by the electronic device of the embodiment.

FIG. 12 is an exemplary flowchart illustrating the procedure of a retrieve process which is executed by the server system of FIG. 6.

DETAILED DESCRIPTION

Various embodiments will be described hereinafter with reference to the accompanying drawings.

In general, according to one embodiment, a system includes a storage controller, and a providing controller. The storage controller is configured to store a plurality of contents in a storage medium. Each of the plurality of contents includes handwritten data including a plurality of stroke data corresponding to a plurality of strokes which are handwritten, image data corresponding to the plurality of strokes, and retrieval information for retrieving the handwritten data. The providing controller is configured to provide, upon receiving a retrieve request including a character string from a terminal, to the terminal either the handwritten data in the content corresponding to first retrieval information, the first retrieval information corresponding to the character string from among retrieval information of the plurality of contents, or the image data in the content corresponding to the first retrieval information.

Figure 1:
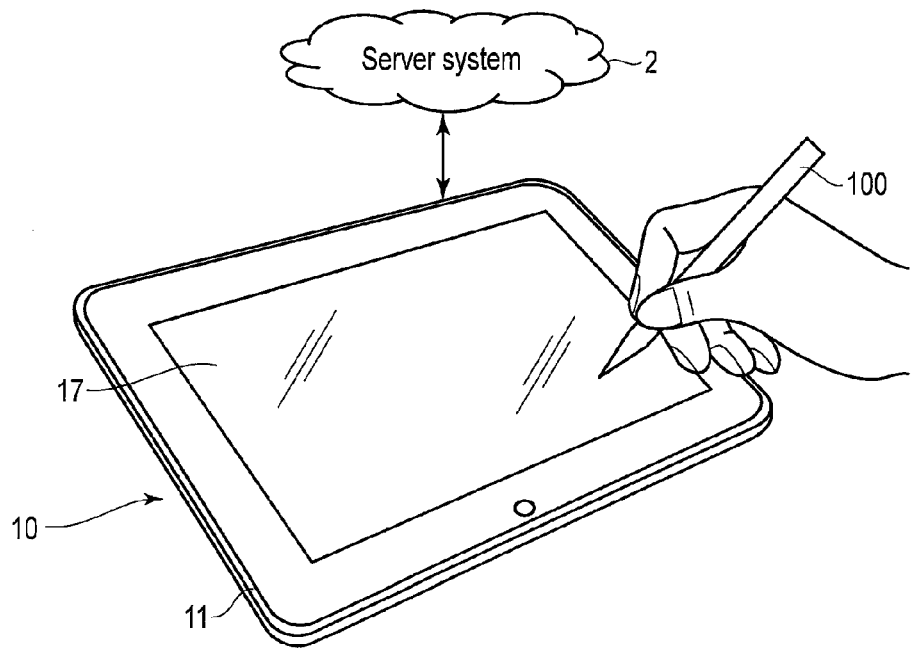
FIG. 1 is an exemplary perspective view illustrating an external appearance of an electronic device according to an embodiment.

FIG. 1 is a perspective view illustrating an external appearance of an electronic device according to an embodiment. The electronic device is, for instance, a pen-based portable electronic device which can execute a handwriting input by a pen or a finger. This electronic device may be realized as a tablet computer, a notebook-type personal computer, a smartphone, a PDA, etc. In the description below, the case is assumed that this electronic device is realized as a tablet computer 10. The tablet computer 10 is a portable electronic device which is also called "tablet" or "slate computer". As shown in FIG. 1, the tablet computer 10 includes a main body 11 and a touch-screen display 17. The touch-screen display 17 is attached such that the touch-screen display 17 is laid over the top surface of the main body 11.

The main body 11 has a thin box-shaped housing. In the touch-screen display 17, a flat-panel display and a sensor, which is configured to detect a touch position of a pen or a finger on the screen of the flat-panel display, are assembled. The flat-panel display may be, for instance, a liquid crystal display (LCD). As the sensor, for example, use may be made of an electrostatic capacitance-type touch panel, or an electromagnetic induction-type digitizer. In the description below, the case is assumed that two kinds of sensors, namely a digitizer and a touch panel, are both assembled in the touch-screen display 17.

Each of the digitizer and the touch panel is provided in a manner to cover the screen of the flat-panel display. The touch-screen display 17 can detect not only a touch operation on the screen with use of a finger, but also a touch operation on the screen with use of a pen 100. The pen 100 may be, for instance, an electromagnetic-induction pen. The user can execute a handwriting operation on the touch-screen display 17 by using an external object (pen 100 or finger). During the handwriting input operation, a locus of movement of the external object (pen 100 or finger) on the screen, that is, a locus (writing trace) of a stroke that is handwritten by the handwriting input operation, is drawn in real time, and thereby the locus of each stroke is displayed on the screen. A locus of movement of the external object during a time in which the external object is in contact with the screen corresponds to one stroke. A set of many strokes, which correspond to handwritten characters or graphics, that is, a set of many loci (writing traces), constitutes a handwritten document.

In the present embodiment, the handwritten document is stored in a storage medium not as image data but as time-series information indicative of coordinate series of each stroke and an order relation between strokes. The details of the time-series information will be described later with reference to FIG. 3. The time-series information is indicative of an order in which a plurality of strokes were handwritten, and includes a plurality of stroke data corresponding to a plurality of strokes. In other words, the time-series information means a set of time-series stroke data corresponding to a plurality of strokes, respectively. Each stroke data corresponds to a certain single stroke, and includes coordinate data series (time-series coordinates) corresponding to points on the locus of this stroke. The order of arrangement of these stroke data corresponds to an order in which strokes were handwritten, that is, an order of strokes.

The tablet computer 10 can read out arbitrary existing time-series information from the storage medium, and can display, on the screen, a handwritten document corresponding to this time-series information, that is, the loci corresponding to a plurality of strokes indicated by this time-series information. Furthermore, the tablet computer 10 has an edit function. The edit function can delete or move an arbitrary stroke or an arbitrary handwritten character or the like in the displayed handwritten document, in accordance with an edit operation by the user with use of an "eraser" tool, a range designation tool, and other various tools. In addition, this edit function includes a function of clearing the history of some handwriting operations. Besides, this edit function can add an arbitrary handwritten character or handwritten symbol to a handwritten document which is being displayed.

In this embodiment, the time-series information may be managed as one page or plural pages. In this case, the time-series information may be divided in units of an area which falls within one screen, and thereby a piece of time-series information, which falls within one screen, may be stored as one page. Alternatively, the size of one page may be made variable. In this case, since the size of a page can be increased to an area which is larger than the size of one screen, a handwritten document of an area larger than the size of the screen can be handled as one page. When one whole page cannot be displayed on the display at a time, this page may be reduced in size and displayed, or a display target part in the page may be moved by vertical and horizontal scroll.

In this manner, since the time-series information can be managed as page data, the time-series information will be also referred to as "handwritten page data" or simply as "handwritten data" in the description below.

The tablet computer 10 includes a network communication function, and can cooperate with other personal computers or a server system 2 on the Internet. Specifically, the tablet computer 10 includes a wireless communication device of, e.g. a wireless LAN, and can execute wireless communication with other personal computers. In addition, the tablet computer 10 can communicate with the server system 2 on the Internet. The server system 2 is a system for sharing various kinds of information, and executes an online storage service, and other various cloud computing services. This server system 2 may be realized by one or more server computers.

The server system 2 includes a large-capacity storage medium such as a hard disk drive (HDD). The tablet computer 10 transmits time-series information (handwritten page data) to the server system 2 over the network, and can store the time-series information (handwritten page data) in the storage medium in the server system 2 ("upload"). In order to ensure a secure communication between the tablet computer 10 and the server system 2, the server system 2 may authenticate the tablet computer 10 at a time of starting the communication. In this case, a dialog for prompting the user to input an ID or a password may be displayed on the screen of the tablet computer 10, or the ID of the tablet computer 10, for example, may be automatically transmitted from the tablet computer 10 to the server system 2.

Thereby, even when the capacity of the storage in the tablet computer 10 is small, the tablet computer 10 can handle many time-series information items (handwritten page data) or large-volume time-series information (handwritten page data).

In addition, the tablet computer 10 can read out ("download") one or more arbitrary time-series information items (handwritten page data) stored in the storage medium of the server system 2, and can display the locus of each stroke indicated by the read-out time-series information on the screen of the display 17 of the tablet computer 10. In this case, the tablet computer 10 may display on the screen of the display 17 a list of thumbnails (thumbnail images) which are obtained by reducing in size pages of plural time-series information items (handwritten page data), or may display one page, which is selected from these thumbnails, on the screen of the display 17 in the normal size.

As has been described above, in the present embodiment, the storage medium in which the time-series information is stored may be the storage in the tablet computer 10, or the storage in the server system 2. The user of the tablet computer 10 can store arbitrary time-series information in an arbitrary one selected from between the storage in the tablet computer 10 and the storage in the server system 2.

Figure 2:
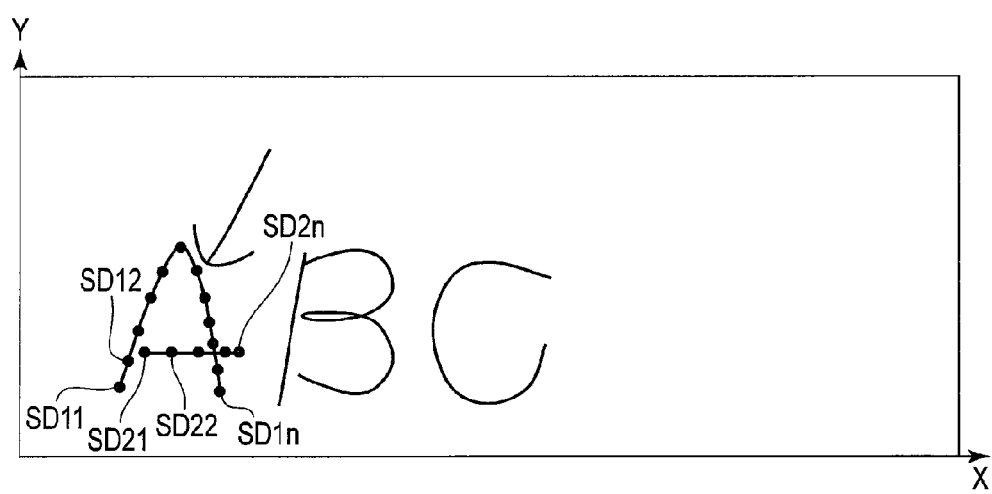
FIG. 2 is a view illustrating an example of a handwritten document which is handwritten on a touch-screen display of the electronic device of the embodiment.
Figure 3:
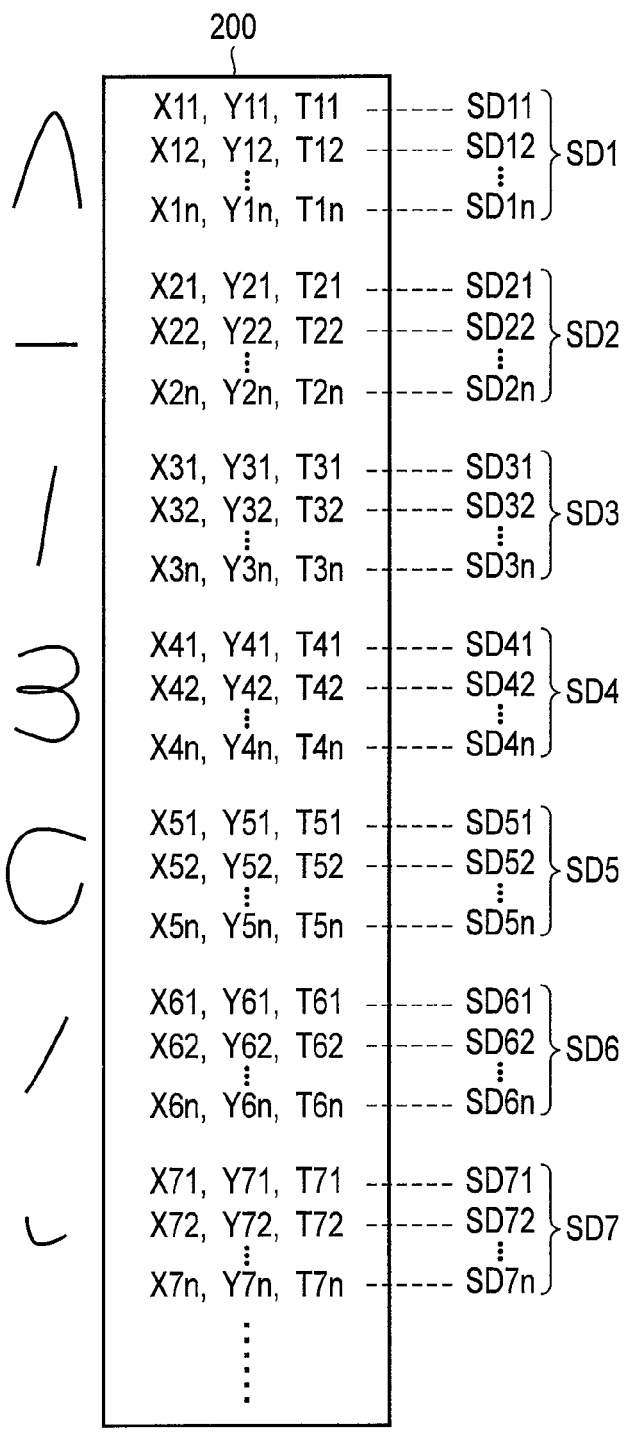
FIG. 3 is an exemplary view for explaining time-series information (handwritten page data) corresponding to the handwritten document of FIG. 2, the time-series information being stored in a storage medium by the electronic device of the embodiment.

Next, referring to FIG. 2 and FIG. 3, a description is given of a relationship between strokes (characters, marks, graphics, tables, etc.), which are handwritten by the user, and time-series information. FIG. 2 shows an example of a handwritten document (handwritten character string) which is handwritten on the touch-screen display 17 by using the pen 100 or the like.

In many cases, on a handwritten document, other characters or graphics are handwritten over already handwritten characters or graphics. In FIG. 2, the case is assumed that a handwritten character string "ABC" was handwritten in the order of "A", "B" and "C", and thereafter a handwritten arrow was handwritten near the handwritten character "A".

The handwritten character "A" is expressed by two strokes (a locus of "Λ" shape, a locus of "-" shape) which are handwritten by using the pen 100 or the like, that is, by two loci. The locus of the pen 100 of the first handwritten "Λ" shape is sampled in real time, for example, at regular time intervals, and thereby time-series coordinates SD11, SD12, . . . , SD1n of the stroke of the "Λ" shape are obtained. Similarly, the locus of the pen 100 of the next handwritten "-" shape is sampled in real time, for example, at regular time intervals, and thereby time-series coordinates SD21, SD22, ..., SD2n of the stroke of the "-" shape are obtained.

The handwritten character "B" is expressed by two strokes which are handwritten by using the pen 100 or the like, that is, by two loci. The handwritten character "C" is expressed by one stroke which is handwritten by using the pen 100 or the like, that is, by one locus. The handwritten "arrow" is expressed by two strokes which are handwritten by using the pen 100 or the like, that is, by two loci.

FIG. 3 illustrates time-series information (handwritten page data) 200 corresponding to the handwritten document of FIG. 2. The time-series information 200 includes a plurality of stroke data SD1, SD2, ..., SD7. In the time-series information 200, the stroke data SD1, SD2, ..., SD7 are arranged in time series in the order of strokes, that is, in the order in which plural strokes were handwritten.

In the time-series information 200, the first two stroke data SD1 and SD2 are indicative of two strokes of the handwritten character "A". The third and fourth stroke data SD3 and SD4 are indicative of two strokes which constitute the handwritten character "B". The fifth stroke data SD5 is indicative of one stroke which constitutes the handwritten character "C". The sixth and seventh stroke data SD6 and SD7 are indicative of two strokes which constitute the handwritten "arrow".

Each stroke data includes coordinate data series (time-series coordinates) corresponding to one stroke, that is, a plurality of coordinates corresponding to a plurality of points on the locus of one stroke. In each stroke data, the plural coordinates are arranged in time series in the order in which the stroke is written. For example, as regards handwritten character "A", the stroke data SD1 includes coordinate data series (time-series coordinates) corresponding to the points on the locus of the stroke of the handwritten "Λ" shape of the handwritten character "A", that is, an n-number of coordinate data SD11, SD12, ..., SD1n. The stroke data SD2 includes coordinate data series corresponding to the points on the locus of the stroke of the handwritten "-" shape of the handwritten character "A", that is, an n-number of coordinate data SD21, SD22, ..., SD2n. Incidentally, the number of coordinate data may differ between respective stroke data.

Each coordinate data is indicative of an X coordinate and a Y coordinate, which correspond to one point in the associated locus. For example, the coordinate data SD11 is indicative of an X coordinate (X11) and a Y coordinate (Y11) of the starting point of the stroke of the "Λ" shape. The coordinate data SD1n is indicative of an X coordinate (X1n) and a Y coordinate (Y1n) of the end point of the stroke of the "Λ" shape.

Further, each coordinate data may include time stamp information T corresponding to a time point at which a point corresponding to the coordinates of this coordinate data was handwritten. The time point at which the point was handwritten may be either an absolute time (e.g. year/month/day/hour/minute/second) or a relative time with reference to a certain time point. For example, an absolute time (e.g. year/month/day/hour/minute/second) at which a stroke began to be handwritten may be added as time stamp information to each stroke data, and furthermore a relative time indicative of a difference from the absolute time may be added as time stamp information T to each coordinate data in the stroke data.

In this manner, by using the time-series information in which the time stamp information T is added to each coordinate data, the temporal relation between strokes can be more precisely expressed.

Moreover, information (Z) indicative of a pen stroke pressure may be added to each coordinate data.

The time-series information 200 having the structure as described with reference to FIG. 3 can express not only the trace of handwriting of each stroke, but also the temporal relation between strokes. Thus, with the use of the time-series information 200, even if a distal end portion of the handwritten "arrow" is written over the handwritten character "A" or near the handwritten character "A", as shown in FIG. 2, the handwritten character "A" and the distal end portion of the handwritten "arrow" can be treated as different characters or graphics.

In the meantime, as the time stamp information of the stroke data SD1, use may be made of an arbitrary one selected from among a plurality of time stamp information items T11 to T1n corresponding to a plurality of coordinates in the stroke data SD1, or a mean value of the time stamp information items T11 to T1n. Similarly, as the time stamp information of the stroke data SD2, use may be made of an arbitrary one selected from among a plurality of time stamp information items T21 to T2n corresponding to a plurality of coordinates in the stroke data SD2, or a mean value of the time stamp information items T21 to T2n. In like manner, as the time stamp information of the stroke data SD7, use may be made of an arbitrary one selected from among a plurality of time stamp information items T71 to T7n corresponding to a plurality of coordinates in the stroke data SD7, or a mean value of the time stamp information items T71 to T7n.

In the time-series information 200 of the present embodiment, as described above, the arrangement of stroke data SD1, SD2, ..., SD7 indicates the order of strokes of handwritten characters. For example, the arrangement of stroke data SD1 and SD2 indicates that the stroke of the "Λ" shape was first handwritten and then the stroke of the "-" shape was handwritten. Thus, even when the traces of writing of two handwritten characters are similar to each other, if the orders of strokes of the two handwritten characters are different from each other, these two handwritten characters can be distinguished as different characters.

Furthermore, in the present embodiment, as described above, a handwritten document is stored not as an image or a result of character recognition, but as the time-series information 200 which is composed of a set of time-series stroke data corresponding to a plurality of strokes. Thus, handwritten characters can be handled, without depending on languages of the handwritten characters. Therefore, the structure of the time-series information 200 of the present embodiment can be commonly used in various countries of the world where different languages are used.

Figure 4:
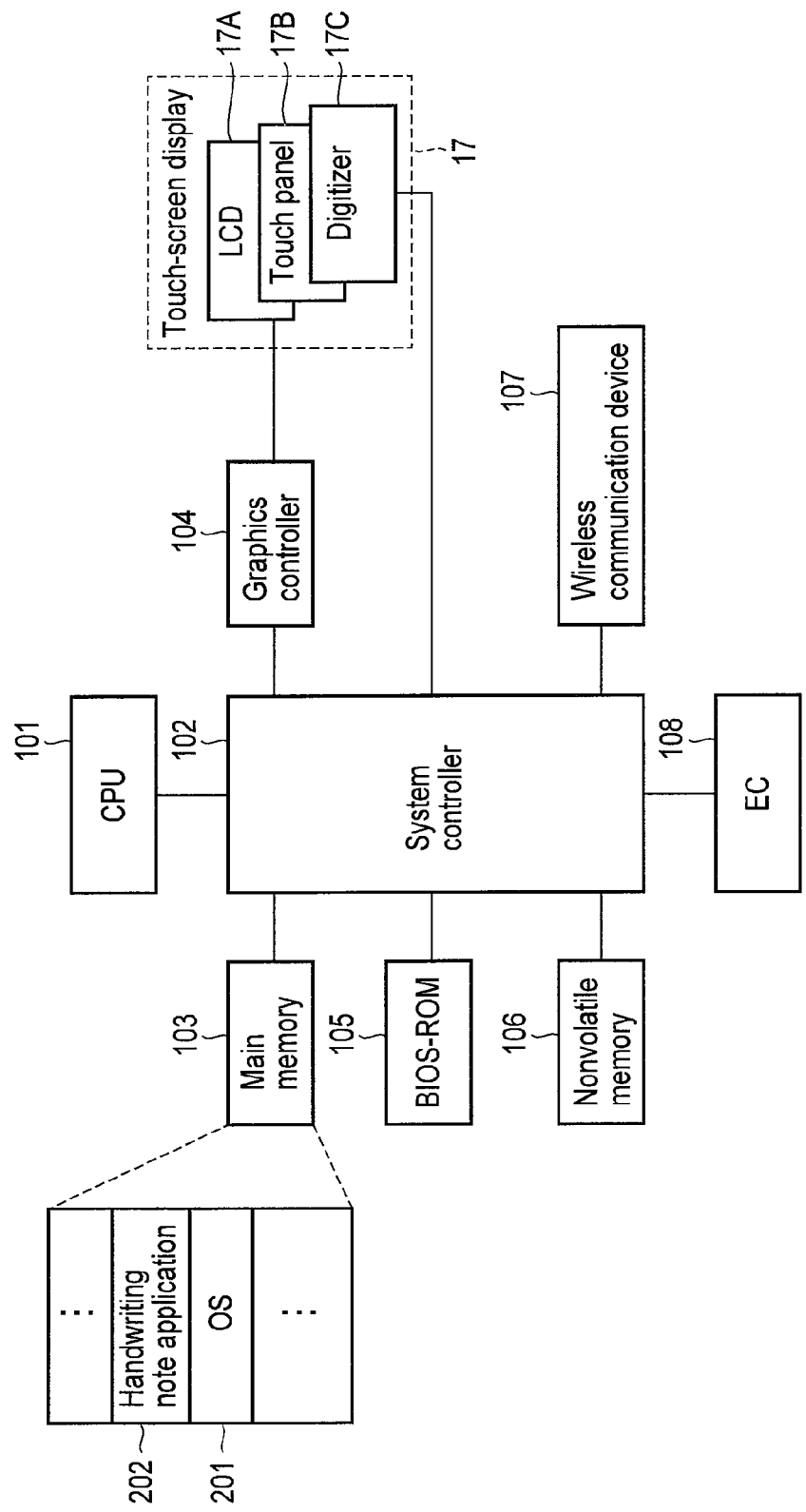
FIG. 4 is an exemplary block diagram illustrating a system configuration of the electronic device of the embodiment.

FIG. 4 illustrates a system configuration of the tablet computer 10.

As shown in FIG. 4, the tablet computer 10 includes a CPU 101, a system controller 102, a main memory 103, a graphics controller 104, a BIOS-ROM 105, a nonvolatile memory 106, a wireless communication device 107, and an embedded controller (EC) 108.

The CPU 101 is a processor which controls the operations of various modules in the tablet computer 10. The CPU 101 executes various kinds of software, which are loaded from the nonvolatile memory 106 that is a storage device into the main memory 103. The software includes an operating system (OS) 201 and various application programs. The application programs include a handwriting note application 202. The handwriting note application 202 includes a function of creating and displaying the above-described handwritten page data, a function of editing the handwritten page data, a handwriting (stroke) retrieve function, and character/graphic recognition function.

In addition, the CPU 101 executes a basic input/output system (BIOS) which is stored in the BIOS-ROM 105. The BIOS is a program for hardware control.

The system controller 102 is a device which connects a local bus of the CPU 101 and various components. The system controller 102 includes a memory controller which access-controls the main memory 103. In addition, the system controller 102 includes a function of communicating with the graphics controller 104 via, e.g. a PCI EXPRESS serial bus.

The graphics controller 104 is a display controller which controls an LCD 17A that is used as a display monitor of the tablet computer 10. A display signal, which is generated by the graphics controller 104, is sent to the LCD 17A. The LCD 17A displays a screen image based on the display signal. A touch panel 17B and a digitizer 17C are disposed on the LCD 17A. The touch panel 17B is an electrostatic capacitance-type pointing device for executing an input on the screen of the LCD 17A. A contact position on the screen, which is touched by a finger, and a movement of the contact position, are detected by the touch panel 17B. The digitizer 17C is an electromagnetic induction-type pointing device for executing an input on the screen of the LCD 17A. A contact position on the screen, which is touched by the pen 100, and a movement of the contact position, are detected by the digitizer 17C.

The wireless communication device 107 is a device configured to execute wireless communication such as wireless LAN or 3G mobile communication. The EC 108 is a one-chip microcomputer including an embedded controller for power management. The EC 108 includes a function of powering on or powering off the tablet computer 10 in accordance with an operation of a power button by the user.

Figure 5:
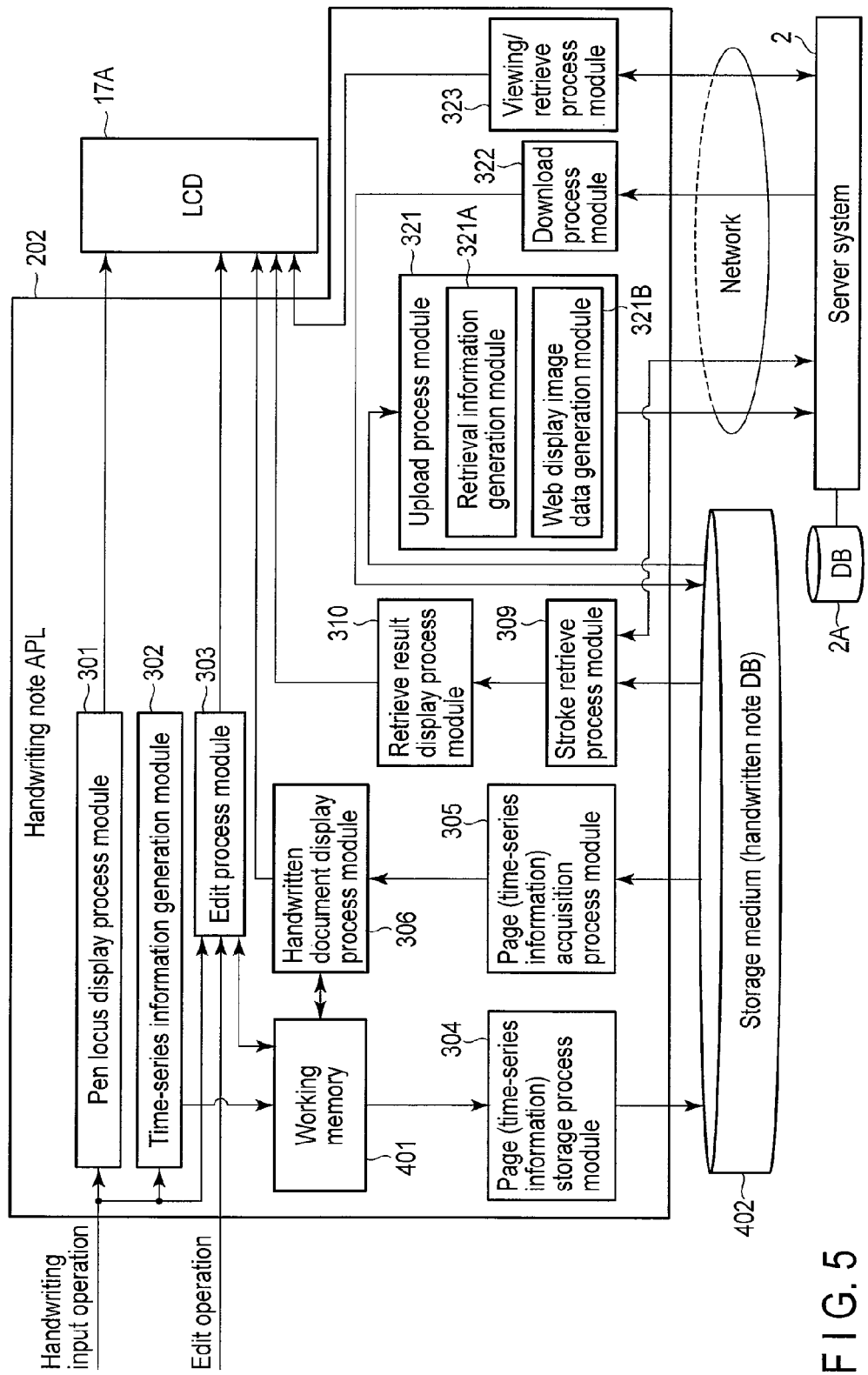
FIG. 5 is an exemplary block diagram illustrating a functional configuration of a handwriting note application program which is executed by the electronic device of the embodiment.

Next, referring to FIG. 5, a functional configuration of the handwriting note application program 202 is described.

The handwriting note application 202 includes a pen locus display process module 301, a time-series information generation module 302, an edit process module 303, a page storage process module 304, a page acquisition process module 305, a handwritten document display process module 306, a stroke retrieve process module 309, a retrieve result display process module 310, an upload process module 321, a download process module 322, and a viewing/retrieve process module 323.

The handwriting note application program 202 executes creation, display and edit of handwritten page data, by using stroke data which is input by using the touch-screen display 17. The touch-screen display 17 is configured to detect the occurrence of events such as "touch", "move (slide)" and "release". The "touch" is an event indicating that an external object has come in contact with the screen. The "move (slide)" is an event indicating that the position of contact of the external object has been moved while the external object is in contact with the screen. The "release" is an event indicating that the external object has been released from the screen.

The pen locus display process module 301 and time-series information generation module 302 receive an event "touch" or "move (slide)" which is generated by the touch-screen display 17, thereby detecting a handwriting input operation. The "touch" event includes coordinates of a contact position. The "move (slide)" event also includes coordinates of a contact position at a destination of movement. Thus, the pen locus display process module 301 and time-series information generation module 302 can receive coordinate series, which correspond to the locus of movement of the contact position, from the touch-screen display 17.

The pen locus display process module 301 receives coordinate series from the touch-screen display 17 and displays, based on the coordinate series, the locus of each stroke, which is handwritten by a handwriting input operation with use of the pen 100 or the like, on the screen of the LCD 17A in the touch-screen display 17. By the pen locus display process module 301, the locus of the pen 100 during a time in which the pen 100 is in contact with the screen, that is, the locus of each stroke, is drawn on the screen of the LCD 17A.

The time-series information generation module 302 receives the above-described coordinate series which are output from the touch-screen display 17, and generates, based on the coordinate series, the above-described time-series information having the structure as described in detail with reference to FIG. 3. In this case, the time-series information, that is, the coordinates and time stamp information corresponding to the respective points of each stroke, may be temporarily stored in a working memory 401.

The page storage process module 304 stores the generated time-series information as handwritten page data in a storage medium 402. The storage medium 402 is a local database for storing handwritten page data.

The page acquisition process module 305 reads out from the storage medium 402 arbitrary time-series information (handwritten page data) which is already stored in the storage medium 402. The read-out time-series information is sent to the handwritten document display process module 306. The handwritten document display process module 306 analyzes the time-series information and displays, based on the analysis result, the locus of each stroke, which is indicated by each stroke data in the time-series information, on the screen as a handwritten page.

The edit process module 303 executes a process for editing a handwritten page which is currently being displayed. Specifically, in accordance with an edit operation and a handwriting input operation which are executed by the user on the touch-screen display 17, the edit process module 303 executes an edit process including a process of adding a new stroke (new handwritten character, new handwritten mark, etc.) to a currently displayed handwritten page, and a process of deleting or moving one or more of a plurality of strokes which are being displayed. Further, the edit process module 303 updates the time-series information which is being displayed, in order to reflect the result of the edit process on this time-series information.

The stroke retrieve process module 309 executes a handwriting (stroke) retrieve process. The stroke retrieve process module 309 does not use codes indicative of an input character string as a retrieve key, but uses as a retrieve key one or more strokes themselves which constitute a handwriting object (handwritten character, handwritten mark, handwritten graphic) which is handwritten on the touch-screen display 17. Then, the stroke retrieve process module 309 retrieves from the storage medium 402 a handwritten page including one or more stroke data having a characteristic similar to the characteristic of the one or more strokes which are the retrieve key. As the characteristic of each stroke, use may be made of a direction of writing of the stroke, the shape of the stroke, the inclination of the stroke, etc.

In this manner, in the stroke retrieve process, not the codes indicative of an input character string, but the stroke(s) is used as the retrieve key. Therefore, retrieval, which does not depend on languages, can be executed.

The case is now assumed that strokes of a certain handwritten character are used as a retrieve key. In this case, handwritten page data (hit handwritten page) including a handwritten character, the degree of similarity of which to the strokes of the handwritten character, which are the retrieve key, is a reference value or more, is retrieved from the storage medium 402. Various methods are usable as the method of calculating the degree of similarity between handwritten characters. For example, coordinate series of each stroke may be treated as a vector. In this case, in order to calculate the degree of similarity between vectors which are targets of comparison, an inner product between the vectors which are targets of comparison may be calculated as the degree of similarity between the vectors which are targets of comparison. In another example, the locus of each stroke may be treated as an image, and the area of a part, where images of loci of targets of comparison overlap to a highest degree, may be calculated as the above-described degree of similarity. Furthermore, an arbitrary device may be made for reducing the amount of computation processing. Besides, DP (Dynamic Programming) matching may be used as the method of calculating the degree of similarity between handwritten characters.

The retrieve result display process module 310 displays a hit handwritten page on the LCD 17A. When there is a plurality of hit handwritten pages, the retrieve result display process module 310 may generate thumbnails of these hit handwritten pages, and may display the thumbnails on the LCD 17A.

In the meantime, the stroke retrieve process can be executed not only on the handwritten page data in the storage medium 402, but also on the handwritten page data stored in a storage medium 2A (server database) of the server system 2. In this case, the stroke retrieve process module 309 transmits to the server system 2 a retrieve request including one or more stroke data corresponding to one or more strokes which are to be used as a retrieve key. The server system 2 retrieves from the storage medium 2A handwritten page data (hit handwritten page) having a characteristic similar to the characteristic of the one or more stroke data, and transmits the hit handwritten page to the tablet computer 10.

The upload process module 321, download process module 322 and viewing/retrieve process module 323 are modules for cooperation with the server system 2. The upload process module 321 uploads to the server system 2 handwritten page data which has been created by the handwriting note application program 202. In this case, in order to enable easy viewing/retrieve of handwritten page data even from an ordinary terminal (e.g. Web client terminal) which does not have capability of handling stroke data, the upload process module 321 automatically generates retrieval information (information for use in retrieving the handwritten page data) and Web display image data (image data for Web client terminal), based on the handwritten page data, and uploads to the server system 2 the handwritten page data, retrieval information and Web display image data in the state in which the handwritten page data, retrieval information and Web display image data are associated with each other. The handwritten page data, the retrieval information and the Web display image data are stored in the storage medium (database) of the server system 2.

The Web display image data is image data corresponding to handwritten page data, that is, image data corresponding to a plurality of strokes. This image data represents a screen image corresponding to the handwritten page data. The handwritten page data may include not only a plurality of stroke data, but also an image such as a still image. In this case, as the Web display image data, use is made of image data for representing a screen image corresponding to the plural strokes and the image. As the format of this image data, use may be made of a bitmap image format, or other various general-purpose image formats.

In order to generate the Web display image data, the upload process module 321 includes a Web display image data generation module 321B. Based on handwritten page data which is a target of upload, the Web display image data generation module 321B automatically generates, for example, a snap shot corresponding to a screen image of this handwritten page data, as Web display image data.

The retrieval information is information usable for retrieving handwritten page data. This retrieval information is used as a kind of index information for enabling easy retrieval of the content of the handwritten page data. The retrieval information may include, for example, text (character string) for retrieving handwritten page data. Text, which is obtained by character-recognizing all handwritten characters in the handwritten page data, may be used as the retrieval information, or a text portion corresponding to some handwritten headings in the handwritten page data, or a text portion corresponding to some handwritten titles, may be used as the retrieval information. Besides, a word, which appears in the handwritten page data, and coordinate information, which is indicative of the position of a handwritten character string corresponding to this word, may be used as the retrieval information.

In order to generate the retrieval information, the upload process module 321 includes an information-for-retrieval generation module 321A. Based on handwritten page data which is a target of upload, the information-for-retrieval generation module 321A automatically generate the above-described retrieval information which includes text representative of the content of this handwritten page data.

The download process module 322 downloads arbitrary handwritten page data which is managed by the server system 2. In this case, it is possible to download, at the same time, not only the handwritten page data but also the Web display image data and the retrieval information, which are associated with the handwritten page data.

The viewing/retrieve process module 303 executes a process for viewing and retrieving handwritten pages which are managed by the server system 2. The viewing/retrieve process module 303 can transmit to the server system 2 a retrieve request including as a retrieve key a character string which is input by the user. The server system 2 retrieves from the storage medium of the server system 2 handwritten page data corresponding to the character string which is designated as the retrieve key, using the retrieval information (index information) which corresponds to each handwritten page data. This retrieve is text retrieve.

FIG. 6 illustrates a flow of data between the server system 2 and each of terminals. In the description below, each terminal is referred to as "client terminal". Client terminals 10A and 10B are terminals having the same function as the tablet computer 10 of the embodiment, that is, terminals with capability of handling stroke data. A Web client terminal 20 is a terminal without capability of handling stroke data, and utilizes a service of the server system 2 by using, for example, an ordinary Web browser.

Handwritten page data (handwritten note data), which has been created by the handwriting note application program 202, is stored in a local storage (database for handwriting notes) of the client terminal 10A. Each handwritten page data includes client information, property, in-page strokes, image information, etc. The in-page strokes are a plurality of stroke data corresponding to a plurality of strokes. The image information is image data such as a still image, which is embedded in the handwritten page data.

When uploading handwritten page data (page information) to the server system 2, each of the client terminals 10A and 10B uploads a Web display image and retrieval information, together with the handwritten page data (page information), to the server system 2. The handwritten page data, Web display image and retrieval information may be uploaded to the server system 2 as a single packaged data.

In addition, each of the client terminals 10A and 10B can download arbitrary handwritten page data, which was uploaded in the server system 2, and can execute viewing of the handwritten page data, retrieve (stroke retrieve)of the handwritten page data, and edit of the handwritten page data. When the handwritten page data is downloaded, the Web display image and the retrieval information, which correspond to the handwritten page data, can be downloaded together.

By using the Web display image and the retrieval information which were uploaded together with the handwritten page data, the server system 2 can provide services for viewing and retrieving the handwritten page data to the Web client terminal 20. By using the Web display image corresponding to each handwritten page data, the server system 2 can generate screen data (Web page) indicative of a list of handwritten page data stored in the storage medium 2A of the server system 2.

In addition, the server system 2 can receive a retrieve request from the Web client terminal 20 and can execute the above-described text retrieve according to this retrieve request. The text retrieve process is executed when the server system 2 has received a retrieve request including a character string. In the text retrieve process, the server system 2 first retrieves, from a plurality of retrieval information stored in the storage medium 2A, retrieval information (first retrieval information) which corresponds to the character string included in the retrieve request. Then, the server system 2 provides (returns), not the handwritten page data itself associated with the first retrieval information, but the Web display image associated with the handwritten page data, to the Web client terminal 20 as a retrieve result for the retrieve request.

The server system 2 can provide services for viewing and retrieval of handwritten page data, not only to the Web client terminal 20 but also to each of the client terminals 10A and 10B. For example, when the above-described text retrieve is executed in response to a retrieve request from the client terminal 10A, the server system 2 first retrieves from the storage medium 2A the retrieval information including a character string in the retrieve request. Then, the server system 2 can provide the handwritten page data itself, which is associated with the retrieval information including the character string in the retrieve request, to the Web client terminal 20 as a retrieve result for the retrieve request.

FIG. 7 illustrates a flow of handwritten page data between handwriting function-capable client terminals 10A and 10B via the server system 2.

The client terminal 10A uploads to the server system 2 handwritten page data together with a Web display image and retrieval information. The client terminal 10B downloads each handwritten page data from the server system 2. The client terminal 10B can display a list (local notes) of handwritten page data stored in the local storage medium of the client terminal 10B and a list (server notes) of handwritten page data stored in the storage medium of the server system 2. In this case, the client terminal 10B creates thumbnail images corresponding to the respective handwritten page data stored in the storage medium of the client terminal 10B, and displays the thumbnail images corresponding to the respective handwritten page data on a display area of the screen which corresponds to the local notes. Similarly, the client terminal 10B creates thumbnail images corresponding to the respective handwritten page data which have been downloaded from the server system 2, and displays the thumbnail images corresponding to the respective handwritten page data on a display area of the screen which corresponds to the server notes. Needless to say, a list of handwritten page data stored in the storage medium of the server system 2 may be displayed by using Web display images corresponding to the respective handwritten page data downloaded from the server system 2.

If a thumbnail image on the server notes is selected by the user, the client terminal 10B displays, based on the handwritten page data corresponding to the selected thumbnail image, the content of this handwritten page data with a large size. Thereby, operations for viewing, retrieving (stroke retrieve) and editing handwritten page data are enabled.

FIG. 8 illustrates a flow of handwritten page data between the handwriting function-capable client terminal 10A and the Web client 20 via the server system 2.

The client terminal 10A uploads to the server system 2 handwritten page data together with a Web display image and retrieval information. The Web client terminal 20 transmits a content list request to the server system 2. Responding to reception of the content list request, the server system 2 generates, with use of the Web display image data which corresponds to each handwritten page data stored in the storage medium 2A of the server system 2, screen data (Web page) indicative of a list of thumbnail images of the handwritten page data stored in the storage medium 2A of the server system 2. Then, the server system 2 transmits this screen data (Web page) to the Web client terminal 20. Thereby, the user of the Web client 20 can view the list of the handwritten page data stored in the server system 2.

Furthermore, the user can retrieve target handwritten page data from the list of the handwritten page data by keyword retrieve, and can display the Web display image data which corresponds to the handwritten page data in this list.

FIG. 9 illustrates a data structure of contents (handwritten contents) which are managed by the server system 2.

The storage medium (database) 2A of the server system 2 can store many handwritten contents. In this example, the case is assumed that handwritten contents #1, #2, ..., #N exist in the storage medium (database) 2A. The handwritten content #1 includes handwritten page data (page information) #1, retrieval information #1 corresponding to the handwritten page data #1, and Web display image data #1 corresponding to the handwritten page data #1. Similarly, the handwritten content #2 includes handwritten page data (page information) #2, retrieval information #2 corresponding to the handwritten page data #2, and Web display image data #2 corresponding to the handwritten page data #2.

FIG. 10 illustrates the structure of the server system 2.

The server system 2 includes a data management module 501, a retrieve process module 502, a retrieve result providing module 503, and a list transmitter 504. The data management module 501 is a storage controller configured to store a plurality of handwritten contents in the storage medium 2A and manage the plurality of handwritten contents stored in the storage medium 2A. As described above, each of the plural handwritten contents includes handwritten page data, which includes a plurality of stroke data corresponding to a plurality of handwritten strokes, Web display image data for displaying an image corresponding to handwritten page data, and retrieval information which includes text for retrieving handwritten page data.

The retrieve process module 502 receives a retrieve request from a client terminal and retrieves from the storage medium 2A first retrieval information which includes a character string designated by the retrieve request. Specifically, in the retrieve process by the retrieve process module 502, the retrieval information #1, #2, ..., #N is the target of retrieval. The retrieve process module 502 first searches the text in the retrieval information #1, and retrieves a character string, which is designated by the retrieve request, from the text of the retrieval information #1. If this character string occurs in the text of the retrieval information #1, the retrieval information #1 is selected as hit retrieve information. Subsequently, the retrieve process module 502 searches the text of the retrieval information #2, and retrieves a character string, which is designated by the retrieve request, from the text of the retrieval information #2. If this character string occurs in the text of the retrieval information #2, the retrieval information #2 is selected as hit retrieve information.

The retrieve result providing module 503 is a providing controller configured to provide either the handwritten page data (plural stroke data) in the handwritten content corresponding to the hit retrieve information, or the Web display image data in the handwritten content corresponding to the hit retrieve information, to the client terminal as a retrieve result for the retrieve request. In this case, if the client terminal, which transmitted the retrieve request, is the handwriting function-capable client terminal 10A or 10B, the retrieve result providing module 503 can provide the handwritten page data to the client terminal. If the client terminal, which transmitted the retrieve request, is the handwriting function-incapable client Web client terminal 20, the retrieve result providing module 503 can provide the Web display image data to the client terminal.

Specifically, the retrieve result providing module 503 includes a client type determination module 503A. The client type determination module 503A determines the type of the client terminal which transmitted the retrieve request, that is, determines whether the client terminal, which transmitted the retrieve request, is the first-type client terminal (handwriting function-capable client terminal) having the capability of handling stroke data. By using the client type determination module 503A, the retrieve result providing module 503 can provide either the handwritten page data (plural stroke data) or Web display image data to the client terminal, in accordance with the type of the client terminal.

Various methods are usable as the method of determining the type of the client terminal. For example, the handwriting function-capable client terminal may transmit a retrieve request including a first identifier indicative of the client type, or a second identifier indicative of the data type (e.g. handwritten page data) that is to be requested. In this case, the client type determination module 503A can determine the type of the client terminal, in accordance with the first or second identifier included in the retrieve request. In addition, the server system 2 can obtain, through the protocol that is used for communication between the client terminal and the server system 2, the name of a program, such as a browser, which operates on the client terminal for communicating with the server system 2. In this case, the client type determination module 503A may determine the type of the client terminal, in accordance with this program name.

For example, upon receiving a content list request from the client terminal, the list transmitter 504 generates a list (Web page) of thumbnail images of respective handwritten page data stored in the storage medium 2A of the server system 2, by using the Web display image data which correspond to the respective handwritten page data stored in the storage medium 2A of the server system 2. Then, the list transmitter 504 transmits this list (Web page) to the client terminal.

In the meantime, the retrieve process module 502 can also execute the same stroke retrieve as the stroke retrieve process module 309 of the tablet computer 10. This stroke retrieve is executed when the retrieve process module 502 has received from the client terminal a retrieve request including one or more stroke data as a retrieve key. Specifically, when one or more stroke data are included in the retrieve request from the client terminal, the retrieve result providing module 503 retrieves, from plural handwritten page data stored in the storage medium 2A, first handwritten page data including one or more stroke data having a characteristic similar to the characteristic of the one or more stroke data included in the retrieve request. Then, the retrieve result providing module 503 transmits the first handwritten page data to the client terminal.

FIG. 11 illustrates the procedure of an upload process which is executed by the tablet computer 10.

The time-series information generation module 302 of the tablet computer 10 generates handwritten page data (page information), as described above. When upload of this handwritten page data to the server 2 has been requested by the user, the upload process module 321 generates, from the handwritten page data, retrieval information corresponding to this handwritten page data (step S11). Further, the upload process module 321 generates, from the handwritten page data, Web display image data corresponding to this handwritten page data (step S12). Then, the upload process module 321 associates the handwritten page data with the retrieval information and the Web display image data, and transmits the handwritten page data, together with the retrieval information and the Web display image data, to the server system 2 ("upload").

A flowchart of FIG. 12 illustrates the procedure of a retrieve process which is executed by the server system 2. The case is now assumed that a retrieve key included in a retrieve request is a character string (retrieve word).

The retrieve process module 502 of the server system 2 receives a retrieve request from a client terminal (step S21). In this case, HTTP is usable for communication between the client terminal and the server system 2. The retrieve process module 502 retrieves, from a plurality of retrieval information which are stored in the storage medium 2A, first retrieval information which corresponds to the character string included in the retrieve request (step S22). In step S22, with respect to each of the plural retrieval information, it is determined whether each retrieval information includes text including the character string which is included in the retrieve request. The retrieval information, which includes the text including the character string included in the retrieve request, is specified as the above-described first retrieval information.

Based on the above-described identifier, etc. in the retrieve request, the retrieve result providing module 503 determines the kind (type) of the client terminal which transmitted the retrieve request (step S23).

If the client terminal which transmitted the retrieve request is a handwriting-capable client terminal (YES in step S24), the retrieve result providing module 503 selects handwritten page data in the handwritten content corresponding to the first retrieval information, and transmits this handwritten page data to the client terminal as a retrieve result for the retrieve request (step S25).

On the other hand, if the client terminal which transmitted the retrieve request is not a handwriting-capable client terminal (NO in step S24), the retrieve result providing module 503 selects the Web display image data in the handwritten content corresponding to the first retrieval information, and transmits the Web display image data to the client terminal as a retrieve result for the retrieve request (step S26).

As has been described above, in the present embodiment, not only handwritten page data including a plurality of stroke data, but also Web display image data and retrieval information, are stored in the storage medium 2A of the server system 2. Thus, by a simple process like ordinary text retrieve, handwritten page data which matches with the retrieve request, or Web display image data, which corresponds to this handwritten page data, can be provided to the terminal. In addition, by simply transmitting a retrieve request to the server system 2, each terminal can easily acquire from the server system 2 target handwritten page data, or Web display image data corresponding to this handwritten page data. Therefore, it is possible not only to share handwritten page data between handwriting-capable terminals, but also to view/retrieve handwritten page data, which was created by a handwriting-capable terminal, from a handwriting-incapable terminal.

The process of the server system 2 of the present embodiment can be realized by a computer program. Thus, the same advantageous effects as with the present embodiment can easily be obtained simply by installing the computer program into a server computer through a computer-readable storage medium which stores the computer program, and executing the computer program.

The process of the tablet computer 10 of the present embodiment can also be realized by a computer program. Thus, the same advantageous effects as with the present embodiment can easily be obtained simply by installing the computer program into an ordinary computer through a computer-readable storage medium which stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
    a storage controller configured to store a plurality of contents in a non-transitory storage medium, each of the plurality of contents comprising handwritten data comprising a plurality of stroke data corresponding to a plurality of handwritten strokes, image data corresponding to the plurality of handwritten strokes, and retrieval information for retrieving the handwritten data; and
    a providing controller configured to provide, upon receipt of a retrieve request comprising a character string from a terminal, to the terminal either the handwritten data in the content corresponding to first retrieval information, the first retrieval information corresponding to the character string from among retrieval information of the plurality of contents, or the image data in the content corresponding to the first retrieval information, wherein the providing controller is configured to provide to the terminal either the handwritten data in the content corresponding to the first retrieval information, or the image data in the content corresponding to the first retrieval information, in accordance with a type of the terminal.

2. The system of claim 1, wherein the providing controller is configured to provide to the terminal the handwritten data in the content corresponding to the first retrieval information, if the terminal is a first-type terminal with capability of handling stroke data, and to provide to the terminal the image data in the content corresponding to the first retrieval information, if the terminal is not the first-type terminal.

3. The system of claim 1, wherein the providing controller is configured to determine the type of the terminal, in accordance with an identifier included in the retrieve request.

4. The system of claim 1, wherein the providing controller is configured to provide, upon receipt of a retrieve request comprising one or more stroke data, to the terminal first handwritten data of the plurality of contents, the first handwritten data comprising a characteristic similar to a characteristic of the one or more stroke data.

5. The system of claim 1, wherein each of the plurality of contents is uploaded to the system from an arbitrary terminal.

6. An information providing method comprising:
    storing a plurality of contents in a non-transitory storage medium, each of the plurality of contents comprising handwritten data comprising a plurality of stroke data corresponding to a plurality of hand written strokes, image data corresponding to the plurality of handwritten strokes, and retrieval information for retrieving the handwritten data; and
    providing, upon receipt of a retrieve request comprising a character string from a terminal, to the terminal either the handwritten data in the content corresponding to first retrieval information, the first retrieval information corresponding to the character string from among retrieval information of the plurality of contents, or the image data in the content corresponding to the first retrieval information, wherein the providing comprises providing to the terminal either the handwritten data in the content corresponding to the first retrieval information, or the image data in the content corresponding to the first retrieval information, in accordance with a type of the terminal.

7. The method of claim 6, wherein the providing comprises providing to the terminal the handwritten data in the content corresponding to the first retrieval information, if the terminal is a first-type terminal with capability of handling stroke data, and providing to the terminal the image data in the content corresponding to the first retrieval information, if the terminal is not the first-type terminal.

8. The method of claim 6, wherein the providing comprises determining the type of the terminal, in accordance with an identifier included in the retrieve request.

9. The method of claim 6, wherein the providing comprises providing, upon receipt of a retrieve request comprising one or more stroke data, to the terminal first handwritten data of the plurality of contents, the first handwritten data comprising a characteristic similar to a characteristic of the one or more stroke data.

10. The method of claim 6, wherein each of the plurality of contents is uploaded from an arbitrary terminal.

11. A computer-readable, non-transitory storage medium comprising a computer program configured to be executed by a computer, the program controlling the computer to execute functions of:
    storing a plurality of contents in a non-transitory storage medium, each of the plurality of contents comprising handwritten data comprising a plurality of stroke data corresponding to a plurality of handwritten strokes, image data corresponding to the plurality of handwritten strokes, and retrieval information for retrieving the handwritten data; and
    providing, upon receipt of a retrieve request comprising a character string from a terminal, to the terminal either the handwritten data in the content corresponding to first retrieval information, the first retrieval information corresponding to the character string from among retrieval information of the plurality of contents, or the image data in the content corresponding to the first retrieval information, wherein the providing comprises providing to the terminal either the handwritten data in the content corresponding to the first retrieval information, or the image data in the content corresponding to the first retrieval information, in accordance with a type of the terminal.

12. The storage medium of claim 11, wherein the providing comprises providing to the terminal the handwritten data in the content corresponding to the first retrieval information, if the terminal is a first-type terminal with capability of handling stroke data, and providing to the terminal the image data in the content corresponding to the first retrieval information, if the terminal is not the first-type terminal.

13. The storage medium of claim 11, wherein the providing comprises determining the type of the terminal, in accordance with an identifier included in the retrieve request.

14. The storage medium of claim 11, wherein the providing comprises providing, upon receipt of a retrieve request comprising one or more stroke data, to the terminal first handwritten data of the plurality of contents, the first handwritten data comprising a characteristic similar to a characteristic of the one or more stroke data.

15. The storage medium of claim 11, wherein each of the plurality of contents is uploaded from an arbitrary terminal.

* * * * *